(12) United States Patent
Weisenberg

(10) Patent No.: US 8,298,613 B2
(45) Date of Patent: *Oct. 30, 2012

(54) METHOD OF SPRAY LINING A PIPE WITH AN ENVIRONMENTALLY COMPATIBLE IMPERVIOUS MEMBRANE

(75) Inventor: Kent Weisenberg, Englewood, FL (US)

(73) Assignee: Quest Inspar LLC, Kent, WA (US)

( * ) Notice: Subject to any disclaimer, the term of this patent is extended or adjusted under 35 U.S.C. 154(b) by 349 days.

This patent is subject to a terminal disclaimer.

(21) Appl. No.: 12/578,077

(22) Filed: Oct. 22, 2009

(65) Prior Publication Data

US 2011/0097486 A1    Apr. 28, 2011

(51) Int. Cl.
B05D 7/22 (2006.01)
(52) U.S. Cl. .......................... 427/236; 427/239
(58) Field of Classification Search .......... 427/230–239; 118/305, 306, 317, 323, DIG. 10, DIG. 13
See application file for complete search history.

(56) References Cited

U.S. PATENT DOCUMENTS

| | | | |
|---|---|---|---|
| 2,842,095 A * | 7/1958 | Leibner | 118/306 |
| 2,859,728 A * | 11/1958 | Hobdy | 118/306 |
| 4,337,723 A | 7/1982 | Davis | |
| 4,774,905 A * | 10/1988 | Nobis | 118/304 |
| 4,938,167 A | 7/1990 | Mizuho et al. | |
| 4,996,940 A * | 3/1991 | Cleary | 118/306 |
| 5,913,977 A | 6/1999 | Nichols | |
| 6,632,475 B1 | 10/2003 | Bleggi | |
| 6,699,324 B1 | 3/2004 | Berdin et al. | |
| 6,966,950 B2 * | 11/2005 | Winiewicz et al. | 118/712 |
| 6,986,813 B2 | 1/2006 | Davis | |
| 7,867,558 B1 * | 1/2011 | Weisenberg | 427/236 |

* cited by examiner

*Primary Examiner* — William Phillip Fletcher, III
(74) *Attorney, Agent, or Firm* — David McEwing

(57) ABSTRACT

A method and apparatus is disclosed for remotely and robotically installing an organic, monolithic, structural and non structural, circumferential and partial radius membranes in conduits, pipelines or passageways. The method of spray lining a pipe, conduit, structure or passageway comprises connecting a liner supply umbilical to an in situ pipe spray liner device, connecting equipment control cables, air supply hose, electrical supply and controls for the two part liner, connecting an air supply to motors, connecting the liner supply hoses to the impingement block, connecting the air supply to one or more air motors powering a servo drive and maintaining the nozzle in the center of the pipe using a remotely controlled rotation table or scissor leg table. This method and apparatus will allow for continuous lining applications of any thickness in one pass, in conduits and passageways employing multi component liquid polymers with rapid mechanical properties formation.

3 Claims, 4 Drawing Sheets

METHOD OF SPRAY LINING A PIPE WITH AN ENVIRONMENTALLY COMPATIBLE IMPERVIOUS MEMBRANE

BACKGROUND OF METHOD AND APPARATUS

1. Field of the Method and Apparatus

The present invention generally relates to apparatuses and methods for installing structural, non structural, circumferential and non circumferential membranes to the interior surfaces of conduits and passageways and more specifically speaks about the ability to ensure the exact membrane thickness on all pre existing undulations or irregularities in the substrate of the conduit and passageways.

2. Description of Related Art

Prior art demonstrates numerous methods to rehabilitate pipelines, conduits and passageways from the inside in order to restore asset integrity. With general infrastructure within the US and around the world in a precarious state of decay, it has been the object of many to provide for a cost effective method to perform in situ-rehabilitation of these properties. In the global municipal arena, waste collection and water distribution systems are seriously compromised with failures creating community disturbances, commercial loss and environmental incidents. In the industrial sector, process lines and transmission lines carry volatile and dangerous materials. These lines are constantly at risk of failure due to age, neglect or lack of funds to replace or repair with traditional methods. The US EPA Clean Water Act of 1989 outlines mandatory restrictions and covenants imposed on municipalities to improve the conditions of their water and wastewater systems. The EPA Conference of Mayors report of 2007 surveys 1500 US Cities' infrastructure needs resulting in $15 B in needed repairs and upgrades. The RSCA has also increased scrutiny on chemical processing facilities and pipeline transmission calling for proactive inspection and repair of millions of miles of pipe, conduit and passageway.

In situ repair methods incorporating a resin impregnated lining tube as described by Wood et al, U.S. Pat. No. 5,409,561 and Kliest, U.S. Pat. No. 6,427,726 have demonstrated a good level of success in limited environments. In these cured-in-place (CIPP) materials, e.g., polyester, vinyl ester and even epoxy resin matrices, are combined with a tubular textile material, positioned within the deteriorated line section, forced into intimate contact with the interior surface of the pipe and allowed to cure. While these methods and associated apparatuses have proven viable, there are many instances and conditions where they are either not practical or unsuitable for difficult applications. Processing times are hours to days, restoration of service laterals is required and aggressive environments sometimes preclude their use. Labor and material costs are significant with CIPP processes but still considerably less than traditional construction methods. In order to address these short comings, others have attempted to design alternate systems incorporating automated application and high performance lining materials.

One of the common chemicals used in lining compositions is styrene. Styrene has a negative environmental footprint and is a suspected carcinogen. Other compositions include plasticizers and catalysts. These chemical continue to be released into pipe flow for years after the installation. Further it is a thermosetting resin. This resin shrinks causing an annulus which in turn lets infiltration back into the pipeline flow. Some pipe lining methods use hot water as an activating agent. This method requires large quantities of the heated water to be placed immediately proximate to the pipeline access. Creating this access often requires the removal of trees or disruption of vegetation.

SUMMARY OF METHOD AND APPARATUS

The lining taught by this disclosure is a combination of isocyanate and amine resin. This lining is benign to the environment. No annulus is created within the pipe lining. The lining material does not contain any volatile organic compounds or chlorofluorocarbon compounds or compounds that are endocrine disruptors. Endocrine disruptors are believed to cause growth defects and may result from relatively minor exposure to chemicals. Finally, the use of an umbilical allows the material to be delivered to the in situ pipe spray lining device without disruption to the environment.

One must first fully appreciate the requirement for exact and precise methods and mechanical components to utilize a remote device for dispensing an ultra fast cure lining material in a pipe. Any design flaw, mechanical flaw, or controls system flaw will cause the system to fail in a matter of seconds. These failures can be catastrophic. The material being dispersed typically flash cures or gels in 4-6 seconds. It only takes an instant for the apparatus to become totally inoperable. While prior art suggest that its methods and mechanics will improve the current technology in spray lining, it does not. It is very evident that the prior art was only tested and utilized in a lab environment and never tested under real world conditions. The prior art was basically a fiction or theory authored based on evidence established in short segments of test pipe under ideal conditions. Underground pipe has no ideal conditions.

For an apparatus to be an improvement over prior art, it has to have the ability to operate for exceedingly long durations in the real world conditions such as a moist or humid atmosphere. For example, it may take over two hours to completely line a pipe segment.

SUMMARY OF DRAWINGS

The accompanying drawings, which are incorporated in and constitute a part of the specification, illustrate embodiments of the invention. These drawings, together with the general description of the invention given above and the detailed description of the embodiments given below, serve to explain the principles of the invention.

FIG. 3 illustrates the end of the rotational spray head assembly.

Figure 1:
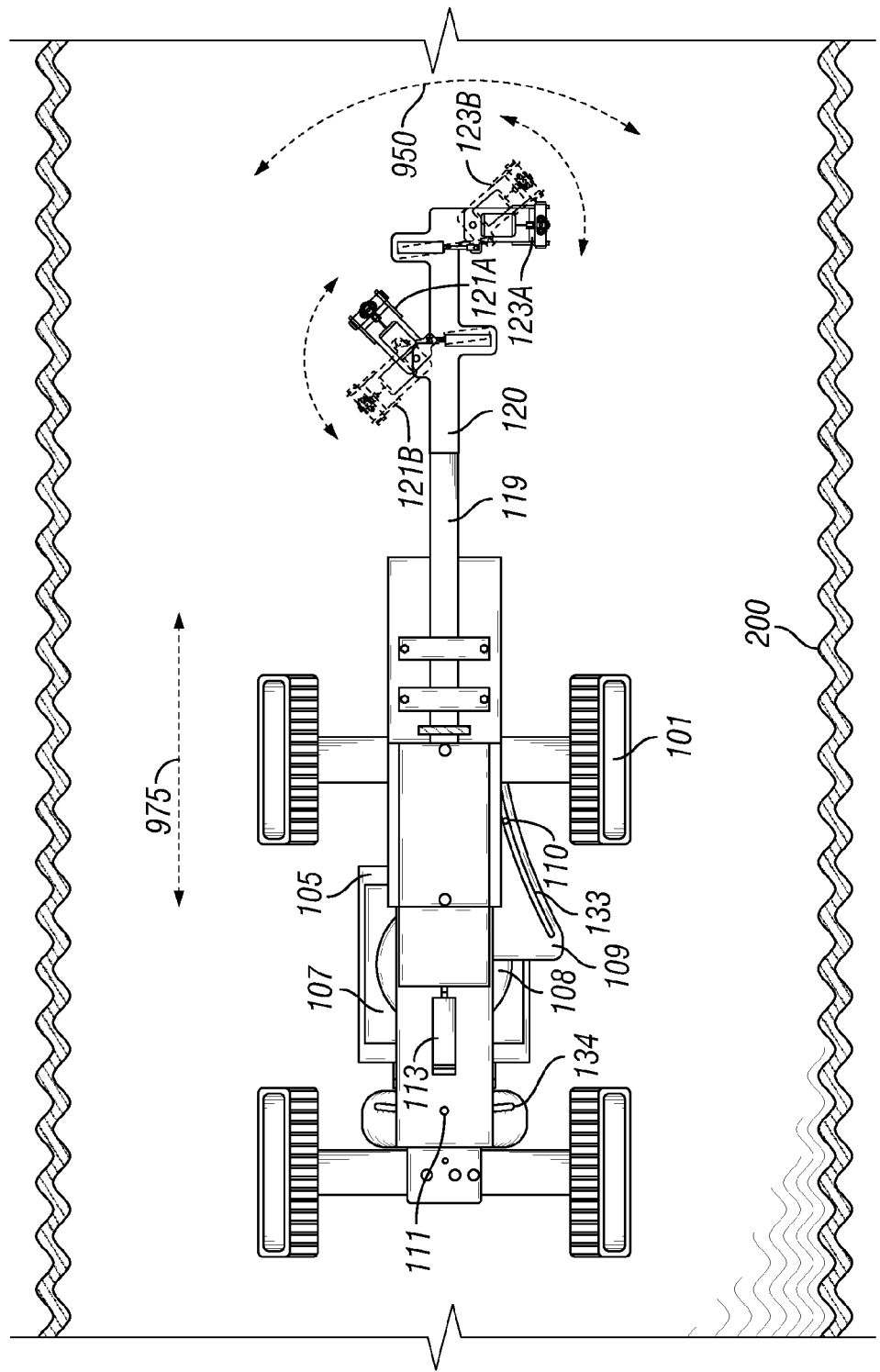
FIG. 1 illustrates a top view of the lining apparatus. Included is the track drive system, pneumatic motor for a forward/reverse lining sprayer oscillation and the separate pendulum oscillation of the rotational shaft and nozzle, guide pins and corresponding tracks in the pendulum oscillation guide plate, and spray nozzles.

It will be appreciated that the foregoing drawings illustrate only one embodiment of the invention and that numerous other variations may be created within the scope of the described invention.

DETAILED DESCRIPTION

The above general description and the following detailed description are merely illustrative of the subject invention and additional modes, advantages and particulars of this invention will be readily suggested to those skilled in the art without departing from the spirit and scope of the invention.

The device is an automated lining apparatus for the repair of underground pipes such as chemical, sewer and circulation water pipes. The apparatus can also be used with other pipe applications including but not limited to industrial process piping. The device can spray liner upon concrete, metal or plastic pipe. The spray device is remotely operated by operators monitoring the pipe and the liner apparatus using cctv and motor controllers for the numerous device motors. Examples of these motor devices include but are not limited to the track system, the scissor leg table, angular table, rotational table, forward/reverse motor, pendulum motor, rotational motor for rotary union, cutter and creel and positioning mechanism for spray nozzle. An operator is not required to be present in the pipe or pipe access, e.g. manhole. Operator presence is frequently required for prior art devices. The prior art places the operator in a hazardous position. Therefore the Applicant discloses increased safety. Surface preparation of the pipe may also be performed remotely. This is enhanced by the flexibility of the sprayer device to line all profiles or irregularities of the pipe using bi-directional (forward and reverse) oscillation and pendulum oscillation, and the ability to apply place liner material thereby creating an arch effect.

As used herein, an arch effect is achieved with the cured liner in the upper portion of the pipe becomes self supporting by resting upon the cured liner in the lower portion of the pipe interior. The thickness of the liner necessary to achieve this arch effect can be calculated. The Applicant's disclosure permits utilization of this effect through the ability of the device to install over 4 inches of liner in a single pass. It will be appreciated that the arch effect does not require the liner to be bonded to the upper portion of the pipe. Utilization of the arch effect eliminates the need for operator entry into the pipe for cleaning, sand blasting or similar to ensure cleanliness of the wall as well as to provide an angular wall profile for the liner to bond to.

The apparatus can be track driven (self propelled) through the pipes as the liner is applied by spraying through one or more nozzle orifices. The motorized mechanism can be powered by compressed air or by electricity. The apparatus possesses the mechanical functions to be manually traversed or self propelled and requires only one access to the pipe, conduit or passageway.

The apparatus can spray pipes having diameters of 24 inches through as least as large as 174 inches. The apparatus can be centered in the varying pipe diameters. This centering can be maintained through bends in the pipe. This constant centering utilizes remotely adjustable scissor lift for vertical adjustment of the spray nozzle and a rotational table for horizontal maneuvering of the spray nozzle. The scissor lift can be powered by a ball screw-electric servo motor and a rotational shaft wherein the servo motor moves the scissor lift vertically by turning the rotational shaft for self centering the spray nozzle.

The thickness of the lining is not limited and may be completed in a single pass. The nozzle may rotate 360° covering the entire circumference of the pipe. Alternatively, the nozzle may traverse only an arc within the circumference. For example, the nozzle may spray an arc of 30° of the pipe circumference. This conserves material and facilitates rapid repair if, for example, only the bottom of the pipe requires lining as in abrasive slurry applications. Conversely, only the top of the pipe may require repair if subject to corrosive vapors.

Figure 2:
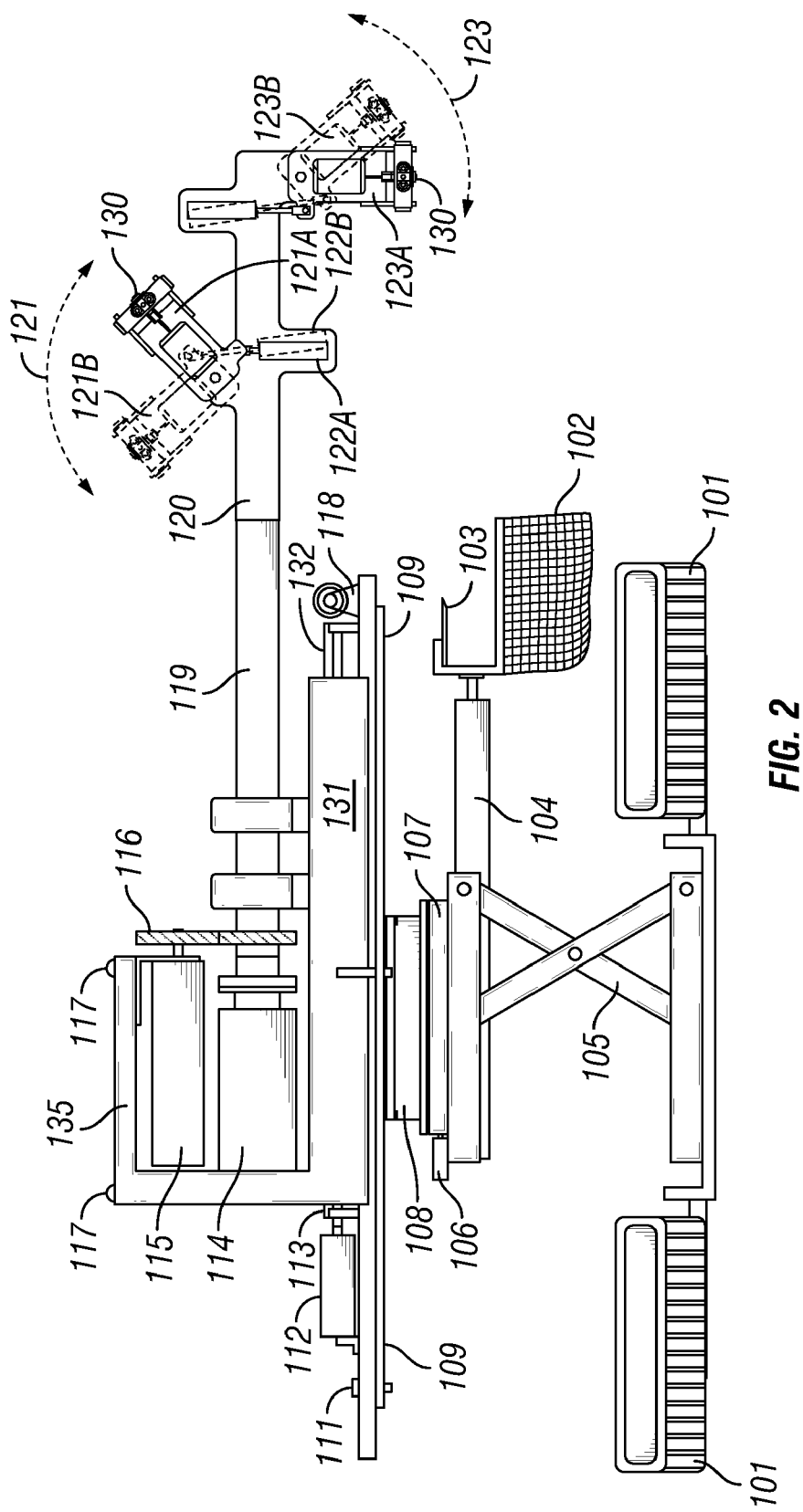
FIG. 2 illustrates a side view of the lining apparatus, including the retractable creel and cleaner tip, and the two offset spray heads. Also illustrated is the scissor leg table for elevating the lining apparatus, the rotational table for centering the spray nozzles located on the rotational spray nozzle.

The device has a rotational shaft with affixed one or more spray nozzles. FIG. 1 illustrates a top view of the liner spray device. Illustrated are two spray nozzles 121A, 123A. Alternate positioning 121B, 123B of the spray nozzles are also depicted. Two spray nozzles may be utilized to increase spray volume or quantity. Two spray nozzles, positioned 180° apart, can counter-balance the other when rotated at high rpms. FIG. 1 shows the two spray heads, comprising the remotely adjustable spray nozzle and the position adjusting piston and cylinder 122 placed asymmetrically in the longitudinal direction of the rotational spray head assembly 120. This rotational spray head assembly can be automatically or manually controlled to rotate continually 360° in either direction by use of rotary unions. The rotary union 114 is located proximate to the rotational shaft 119 as depicted in FIG. 2, illustrating a side view of the liner spray device. The rotational shaft transfers rotational power to the rotational spray head assembly. The rotation is powered by a pneumatic motor 115 with variable speed and direction through gear assembly 116. See FIG. 2. The shaft can also be automatically or manually controlled to go clockwise or counter clockwise in any degree radius for spot repairs or to only line the top of a pipe or a bottom of a pipe. The spray device can be remotely controlled for any rotation cycle or set to automatically reverse direction after completion of each oscillation cycle (forward and reverse).

Figure 3:
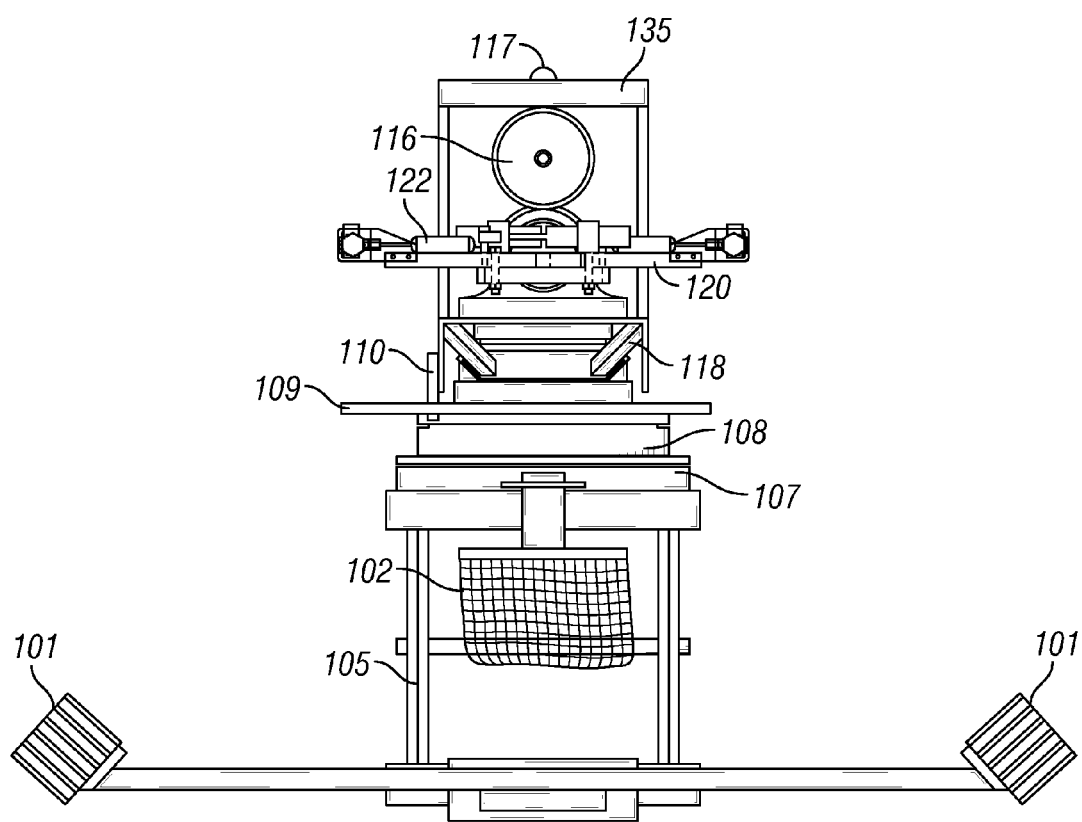
FIG. 3 illustrates a front view of the lining apparatus with the scissor lift connected to the angular table and rotary table, and guide rollers. Also illustrated are the angled powered track rollers. Also illustrated is the debris creel for catching cured liner spray from the nozzle orifice.
Figure 4:
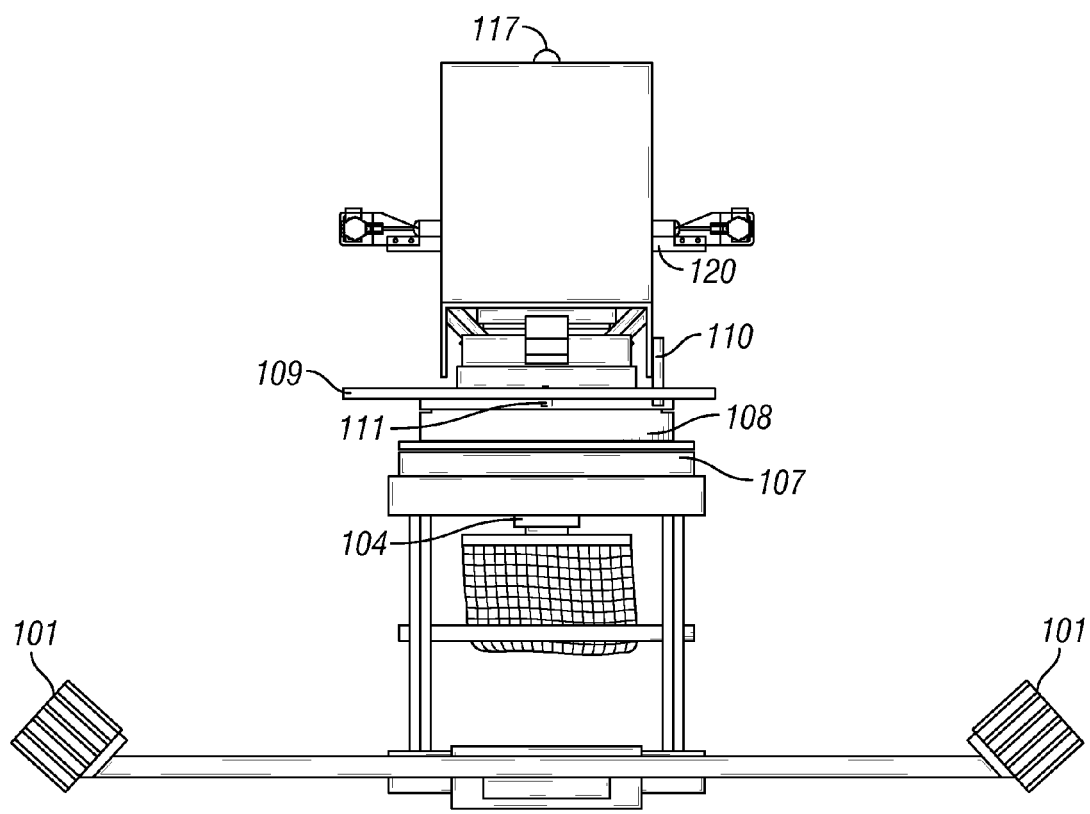
FIG. 4 illustrates a rear view of the lining apparatus illustrating the angular table and the rotary table. Also illustrated is the pendulum guide plate and guide pins.

The liner spray device and liner spray application method utilizes oscillation of the spray nozzle in a forward/reverse motion. This motion is illustrated by Vector arrow 975 in FIG. 1. This movement is parallel to the longitudinal axis of the pipe. The longitudinal axis extends the length of the pipe. The rotational spray head assembly can be automatically controlled via remote control to change directions (clockwise and counter clockwise) after each oscillation cycle and without interruption of liner material flow. The forward/reverse motion can be controlled by an air or electric powered self reversing ball screw pushing the rotational head and rotating spray nozzle forward up to 72 inches and pulling the spray nozzle back. See FIG. 2, illustrating the rotating motor 112, self reversing ball screw 113 and guide track 132. FIG. 3, illustrating a front view of the liner spray device, illustrates guide rollers 118 and guide pin 110 controlling the forward/reverse oscillation. This oscillating motion is repeated rapidly as the device moves through the pipe. This oscillation motion may occur at up to 100 rpm. The motion facilitates an even spray lining. Also included on the oscillation bracket assembly are as many as two impingement blocks for the efficient mixing of products and electromagnetically and/or pneumatically controlled valve mechanisms for the precise remote manipulations of fluid lining flows. FIG. 3 also illustrates an end view of the rotation spray head assembly 120. It will be appreciated that the rotation spray head assembly spins around on a horizontal axis.

The methodology presented incorporates diffusion devices in conjunction with the pneumatic or intrinsically safe motor, mechanical cutter and variable and adjustable metrics to provide a conduit lining with precise application control and improved function. The apparatus includes a main self traversing component body including electromagnetic actuators, pneumatic cylinders, linear actuators relays, solenoids, pneumatic tip cleaner (cutter) and debris creel, attachment points for liner supply umbilical, cameras and diameter specific guides and a pendulum oscillation bracket. The spray device has been illustrated with adjustable nozzles that spray liner through an orifice on to the pipe wall. The spray device can also be modified to utilize a spray stream striking a rotating disk or diffusion device that throws the liner onto the pipe wall.

The device and method can utilize a second oscillating motion. This motion is referred herein as a "pendulum oscillation". This motion entails the arm, holding the spray nozzle, pivoting left to right in a radial (pendulum) manner. The rotational shaft rotates the spray nozzle 360° while the spray nozzle is simultaneously oscillated in a pendulum manner. The device may utilize a pendulum roller bracket for controlling a rotational head 135 moving in a pendulum pattern and causing the rotating spray nozzle to move from side to side while the spray nozzle shifts in orientation to the pipe wall. In the embodiment illustrated in FIG. 1, the guide pins 110, 111 of the rotational head moves in tracks 133, 134 in the pendulum oscillation guide plate 109. The design of the tracks forms the swinging movement of the rotation spray head assembly. The motion of the rotational spray head assembly 120 forms an arc 950. At each end of the arc, the orifice 130 of the spray nozzle 121A, 123A is partially pointed in the longitudinal direction of the pipe 200. This permits the liner to be sprayed on all sides of protrusions, corrugations and uneven surface profiles of the pipe or at joint/pipe interfaces. The pendulum oscillation allows the spray pattern to be perpendicular to any profile on the pipe wall regardless of the angle of the profile. The device continuously changes angles of the spray head throughout the oscillation stroke. Liner coverage may be optimized by positioning the spray nozzles in the position represented by nozzle 121B. The second spray nozzle 123A can be similarly positioned. This assures all angular profiles are aligned at the same thickness. Examples of this improved spray pattern include but are not limited to spray lining of helically corrugated pipe 200. If the spray heads were constantly perpendicular to the plane of the pipe wall, the result would be much more lining on the peaks and valleys of the corrugation and limited quantity of lining on the slopes. The pendulum motion can be combined with the linear oscillation of the rotating spray nozzles.

The spray nozzles may be manually adjusted to create a more acute angle to the pipe wall than may be achieved with the pendulum oscillation. FIG. 2 illustrates both spray nozzles 121A and 123A in alternate positions 121B, 123B. The orifice 130 of each nozzle is also illustrated.

The spray orifice 130 can spray in a fan shaped pattern or a round-cone pattern depending upon the pipe material composition and profile. The device can spray lining from 0.05 inches to over 4 inches in one pass.

The spray device is connected to the air supply, and the 2 part liner supply by means of a liner supply umbilical. The umbilical can also include an electrical supply and control wires and cctv cables. The in situ spray liner device can be remotely controlled using cctv cameras mounted on the spray device and the control wires connected to components of the spray device. In the embodiment illustrated in FIG. 2, two cameras 117 are installed on the top of the rotational head 135.

The remote control capability of the spray liner device includes the ability to remotely start and stop the lining operation by moving the termination rod within the impingement block. This action stops the flow of liner from the impingement block. For example, the spray of liner must stop for the cutter 103 and creel component 102 to operate. The cutter and creel can be remotely controlled. The remote control capability also includes the ability to stop the in situ pipe spray liner device for remedying control malfunctions or for the installation of joint sleeve applications. Joint sleeves are components that fit at the juncture between two pipes or can be utilized in areas of cracks or holes in pipe for sealing and/or structural reinforcement. This joint sleeve repair function entails numerous starts and stops of the spray liner device including rotation and oscillation.

The liner comprises a mixture of isocyanate and amine resin mixed between 140° F. and 170° F. The components may be heated within the spray device up through and including the spray nozzle. The liner components are supplied through the umbilical through two separate hoses. In one embodiment the liner components are maintained apart until immediately before conveyance to the spray orifice. The liner components can be separately injected into a fluid shaft 119 via a rotary union 114. See FIG. 2. They are then conveyed to be mixed in an impingement block located in the oscillation bracket assembly and then dissipated through the spray orifice 130 of nozzles 121A, 123A. The flow, velocity and pressure of the liner material can be remotely controlled in the impingement block. The flow is controlled by positioning of a termination rod. The lines can be remotely cleared with high pressure air or other fluid. The impingement block can be located between the rotary union and the fluid shaft 119. In one embodiment, the fluid shaft contains multiple longitudinally bored holes. Liner components are conveyed separately through the fluid shaft at high pressure. The mixed components (mixed in the impingement block) rapidly cure, e.g., 5 seconds. Once the mixture cures, the liner is inert.

The device may utilize remote controlled self propulsion. The device is illustrated with 4 drive tracks 101. This system may be used to insert and to retract the device from the pipe. The liner supply umbilical may also be used for retracting the device from the pipe. The device requires only one access port into the pipe.

A prior art spraying apparatus traversing over a profile of as little as 0.50" at one end of the apparatus can be compounded to as much as 2 inches at the other end. This results in a dramatic increase or a dramatic decrease in liner thickness in the radial areas during traversing over the profile. With the prior art devices, design calculations for soil load and or pressure containment are of little merit as the contractor cannot assure the client of consistent liner thickness. Current art is antiquated when it comes to maintaining proper shaft/dissipation device alignment in the center of any diameter. This is another reason for contractors being unable to predict liner thickness. Current art relies on fixed non adjusting shafting between carriage and dissipation devices which in turn relays any offset in the pipe to the dissipation device action.

The Applicant's spray device also incorporates mechanical components that allow accurate vertical and horizontal positioning of the spray head. See FIG. 2. These mechanical components include but are not limited to a scissor table 105 vertically centering the rotational spray head assembly 120 via proximity sensors or gyroscope. The spray nozzle 121, 123 is horizontally centered using the rotational table 108. The rotational table is adjustable to 90° in either horizontal direction of the centerline. This assures consistent liner thickness circumferentially through up to 90° bends and also straight run applications. The rotational table is a geared table that is driven by an electric motor or pneumatic motor. It is operated remotely via cctv camera by the operator when traversing through bends. The spray device also includes an adjustable angular table 107 with a pneumatic motor 106. The forward edge of the table can be elevated to a 45° angle to the back table edge. This movement elevates the spray head assembly and the fluid shaft in communication with the rotary union.

The in situ pipe spray liner also includes a component further comprising the ball screw-electric servo motor that can line pipe, conduits, structures and passageways from horizontal through varying degrees to fully vertical. All fully vertical pipe is lined by traversing the robot reversely or in an upward path in the pipe segment. The shaft is then centered remotely just as it is in a horizontal pipe.

Correct alignment allows consistent liner thickness circumferentially. The device utilizes a scissor lift 105 to control height of the spray nozzle head assembly 120. Proximity sensors are attached proximate to the rotating shaft. The sensors send signals to limit switches/relays that operate the rotary screw drive motor that operates the vertical scissor lift. When prior art devices traverse over any offset or large profile in the pipe, the extended nozzle head assembly device is dramatically affected. The nozzle head assembly device moves closer to some portions of the pipe wall and more distant from other portions.

The Applicant's spray device can be equipped with two spray heads 121A, 123A. Both spray heads may be simultaneously used depending upon the pipe diameter and the required liner thickness. The device has the capability to line both horizontal and vertical pipes. Each spray nozzle can be remotely controlled. The orientation of the spray nozzle to the pipe wall can be adjusted using a piston and cylinder arrangement 122. Alternate nozzle positions are illustrated 121B, 123B. The cylinder controlling the spray nozzle can pivot. See the variable positions illustrated 122A, 122B. Each spray nozzle is installed in the rotational spray head assembly 120. It will be appreciated that the two nozzles are installed asymmetrically along the length of the spray head assembly. Examples of variable positions of each spray nozzle are also illustrated for the second spray nozzle 123A, 123B.

The spray build up remover (cutter) 103 pertains to the proper functioning of the spray orifice located in the spray head assembly. The mixed and partially cured liner is emitted through the spray orifice 130. The liner components rapidly cure. Some quantity of the liner material will inherently build on the spray orifice over long periods of time due to this rapid cure. The cured liner builds up at the orifice, forming long stalactites. The removal component of the device may be used for the large material outputs that are required for lining large diameter pipe with liner thicknesses of 0.25" or more for long durations.

The spray device has a mechanical component that will cut any build up off of the spray orifice 130 and retrieve that build up in the attached creel 102 prior to being able to fall to the pipe floor. See FIG. 2. Build up at the spray orifice is easily visible to the remote device operator via cctv. When build up is noticed, the operator actuates the termination rod located in the impingement block to stop the spraying process. The operator disengages the rotation of the sprayer. The cutter 103 and creel assembly 102 is activated. It may be deployed using a pneumatic cylinder 104 but other mechanism may be used. The cutter and creel extends to a calibrated location that extends slightly past the spray orifice and 0.125" below the spray orifice. The operator slowly rotates the dissipation device so that the spray nozzle swings past the cutter which removes the built up piece or block of cured material from the tip. The built up piece falls into the basket like creel below. The cutter and creel are retracted to the resting position and the lining process continues.

Prior art simply allows the build up of cured liner to occur. The residue on the spray orifice is typically a long, semi cylindrical, jagged block of hardened product. In the prior art, the residue is allowed to fall onto the pipe floor and/or be thrown off by the centrifugal force of the rotation. This creates either a void in the liner—if the block falls off onto an unlined area—as the apparatus does not have the capability to seal over the jagged block. Additionally if the block falls onto a partially lined section the block is then encapsulated in the liner resulting in a future effluent flow impediment and/or a catching device for solids in the effluent. In larger pipe diameters their units require operator entry to manually crawl down the pipe to clean the tip.

The 5 fluid port and 3 disc electrical rotary union 114 allows fluids to pass from affixed ports to the rotating shaft 119. Fluid hoses are connected to one side of the union. The fluid then passes through an interior shaft in the union that is individually ported. Passageways and seal systems allow the union to transmit fluids while the rotating shaft (connected by machined coupling at the other end of the union) is rotating.

The motor 115 is mounted above the rotary union 114 (see FIG. 2) at the rotational head 135 and communicates only to the rotational shaft through a gear drive 116. The rotating shaft may be configured to convey fluid and for conveyance of electrical power. When the union is connected to the shaft via coupling, it becomes basically an extension of the shaft. The back of the union is bolted to a plate to keep the union's casing from being able to rotate. Only the interior shaft of the union rotates. The segmented casing on the outside where the hoses are affixed does not rotate.

The rotational shaft and head are connected to a carriage 131. This carriage is what oscillates forward and reverse as illustrated in Vector arrow 975. Everything mounted to that carriage moves when oscillating extension and retraction take place. This includes the rotational spray head assembly 120 with the adjustable spray nozzles 121, 123. Also included is the pneumatic motor with adjustable speed and direction 115. The forward and reverse motion is powered by a pneumatic or electrical motor 112 coupled to a self reversing ball screw drive 113 and rotational shaft 132.

In another embodiment, the spray device may be operated without bi-directional (forward and reverse) oscillation or without pendulum oscillation. This embodiment could be used after extensive surface preparation of the pipe interior to allow application of thin mil system, i.e., liner 15 to 60 mils thick.

The in situ pipe spray liner device of claim 1 further comprising the ball screw-electric servo motor that can line pipe, conduits and structures. All fully vertical pipe is lined by traversing the robot reversely or in an upward path in the pipe segment. The shaft is then centered remotely just as it is in a horizontal pipe.

This specification is to be construed as illustrative only and is for the purpose of teaching those skilled in the art the manner of carrying out the invention. It is to be understood that the forms of the invention herein shown and described are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention may be utilized independently of the use of other features, all as would be apparent to one skilled in the art after having the benefit of this description of the invention.

Further modifications and alternative embodiments of this invention will be apparent to those skilled in the art in view of this specification.

What I claim is:

1. A method of spray lining a pipe, conduit, structure or passageway comprising the steps of:
   (a) connecting a liner supply umbilical to an in situ pipe spray liner device wherein the umbilical comprises separate hoses for a two part liner components, an electrical supply, an air supply hose, cctv connection and equipment control cables;
   (b) connecting the cctv connection, equipment control cables, air supply hose, electrical supply and controls for the two part liner to a remote control location;
   (c) connecting an air supply to motors powering the in situ pipe spray liner device track system;
   (d) connecting the liner supply hoses to an impingement block;
   (e) connecting the air supply to one or more air motors powering a servo drive for extending the spray nozzle forward and backward and to rotate the spray nozzle and install liner on the inside wall of the pipe, conduit, structure or passageway; and
   (f) maintaining the nozzle in the center of the pipe, conduit, structure or passageway using a remotely controlled rotation table or scissor leg table.

2. The method of claim 1 further comprising remotely adjusting the pressures, velocities and the flows of liner material stream to the in situ pipe spray liner device via a liner supply umbilical connection that are directed to a spray nozzle component.

3. The method of claim 1 further comprising the spray lining of pipe, conduit, structure or passageway without placing one or more operators within the pipe, conduit, structure or passageway or pipe, conduit, structure or passageway access during the spray lining.

* * * * *